Nov. 11, 1941.                T. C. GEST ET AL                 2,262,178
                              TUBE CUTOFF MACHINE
                              Filed Aug. 26, 1940          3 Sheets-Sheet 1
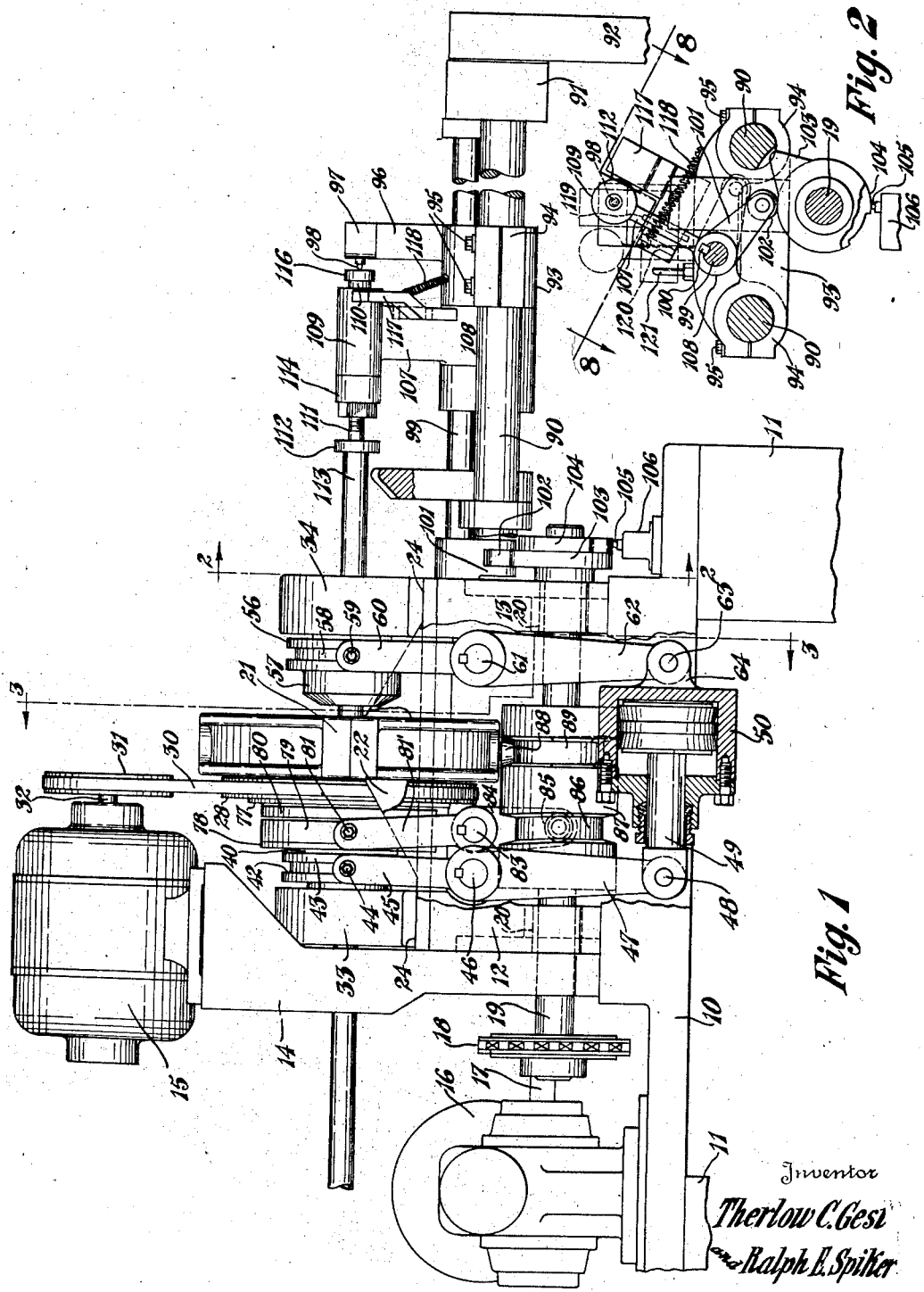
Inventor
Therlow C. Gest
Ralph E. Spitler
By Frease and Bishop
Attorneys

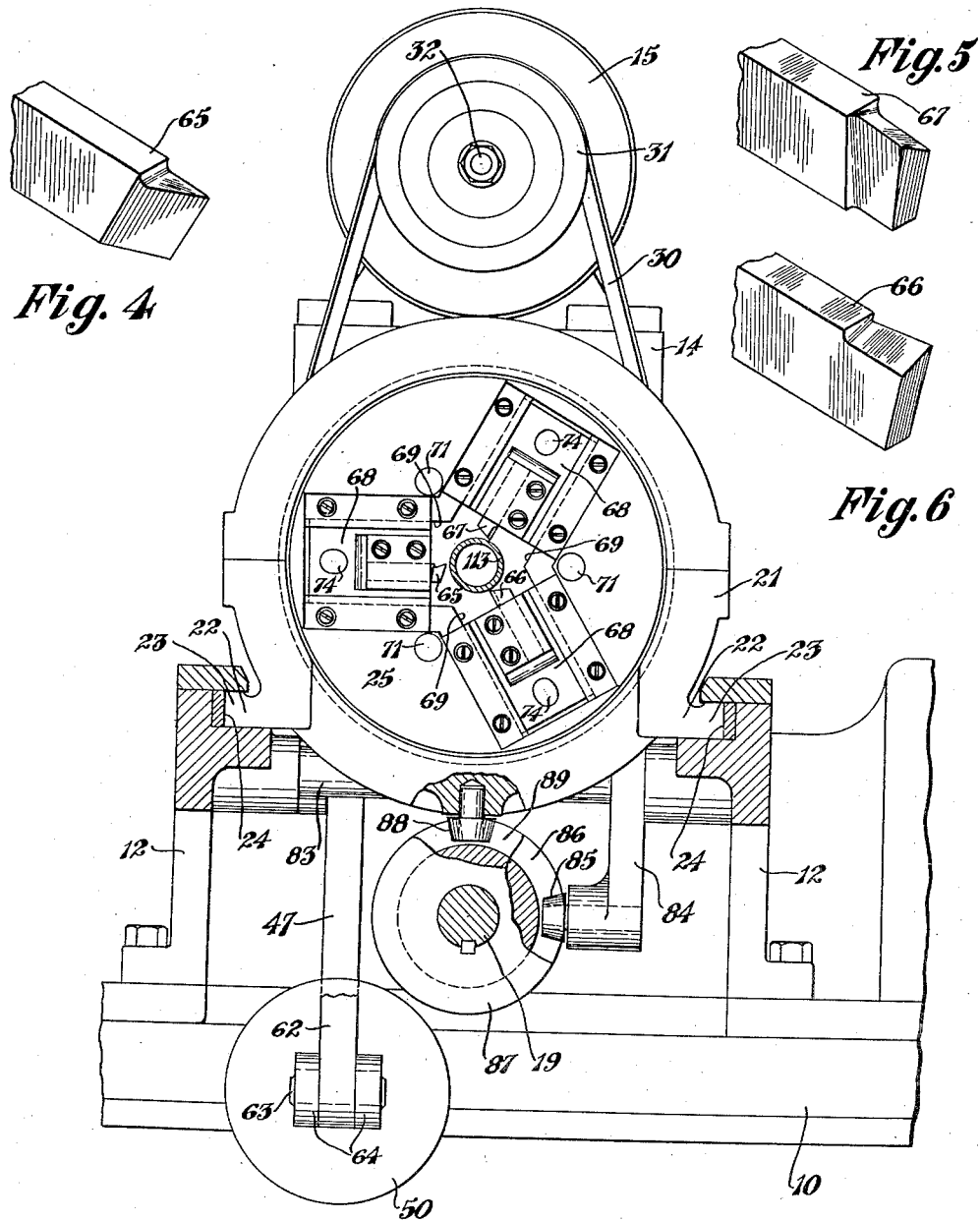

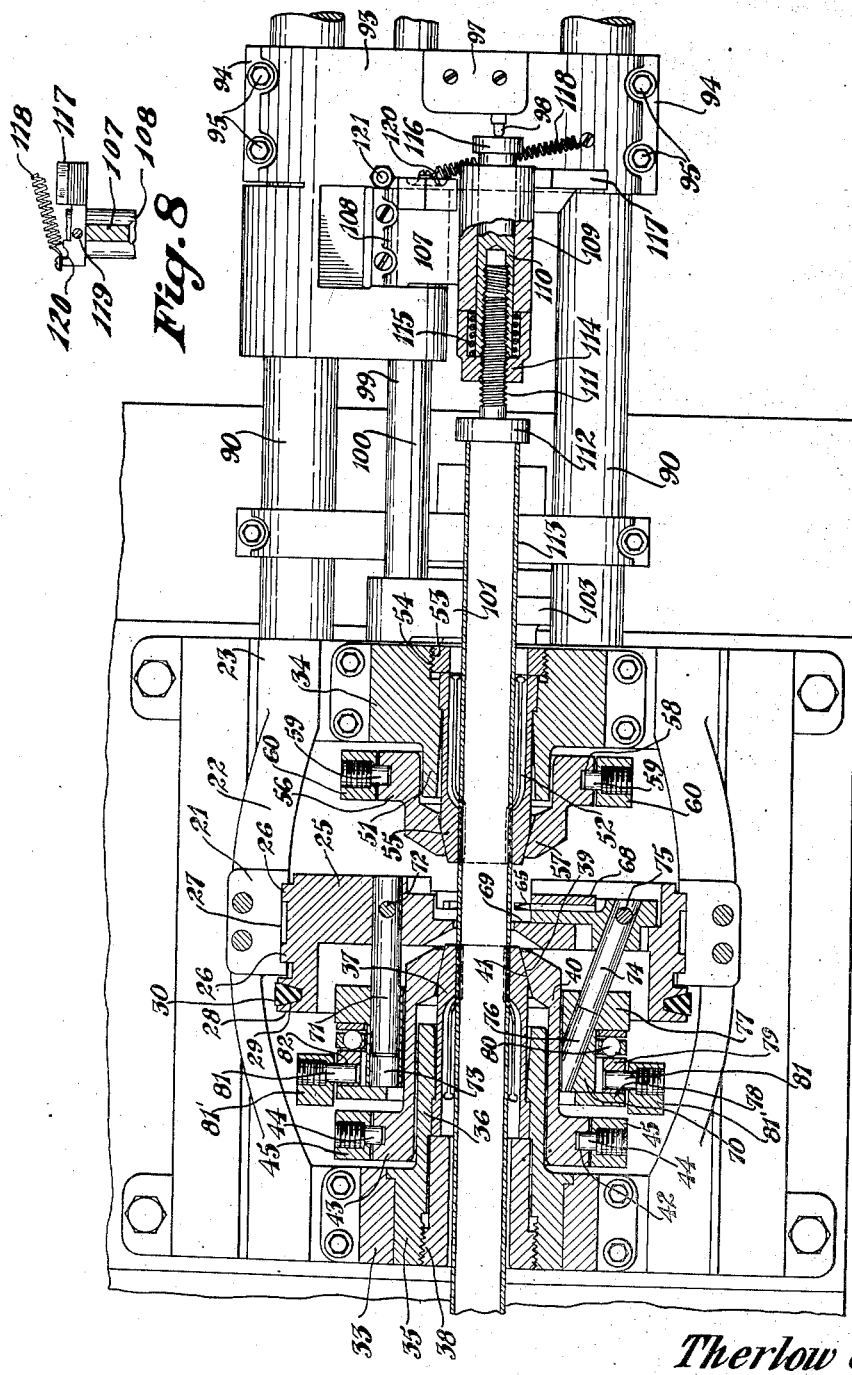

Patented Nov. 11, 1941

2,262,178

UNITED STATES PATENT OFFICE 2,262,178

TUBE CUTOFF MACHINE

Therlow C. Gest, Cleveland, and Ralph E. Spiker, North Canton, Ohio

Application August 26, 1940, Serial No. 354,214

9 Claims. (Cl. 82—20)

The invention relates to machines for cutting off tubes, bars, and the like, and more particularly to a machine for cutting off tubes and facing the ends of the cut to produce a tube of accurate length.

The object of the invention is to provide a machine for cutting off tubes and the like and facing the ends of the cut, the cutting off and facing tools being rotated and moved radially relative to the tube, relative longitudinal movement being produced between the tube and the facing tools.

Another object is to provide a machine of this character in which the tube to be cut off is gripped on opposite sides of the cut by clamping collets, the cutting off and facing tools being carried in a ring which is rotated relative to the tube, the tools being fed radially relative to the tube and the ring being moved longitudinally in opposite directions relative to the tube.

Another object is to provide a machine of this character in which the insertion of the tube into the machine automatically starts a cycle of movement which causes the clamping collets to grip the tube on each side of the cut, feeds the tools radially toward the tube, moves the facing tools longitudinally in opposite directions relative to the tube then withdraws the tools radially and releases the clamping collets.

A further object is to provide a machine of this character in which a cycle of movement is started by contact of the end of the tube with a micro-switch and the cycle of movement is stopped by contact of a cam with another micro-switch.

A still further object is the provision of a machine of this type in which cutting off and facing tools are carried in a continuously rotating ring, in which the clamping collets are operated by a fluid cylinder controlled by the starting micro-switch, in which the tools are moved radially inward by cam means operated by the starting micro-switch, in which the tool carrying ring is moved longitudinally of the tube in opposite directions by cam means operated by the starting micro-switch, and in which the fluid cylinder is operated to release the clamping collets by means of a second micro-switch.

The above objects together with others which will be apparent from the drawings and following description may be attained by constructing the improved machine in the manner illustrated in the accompanying drawings in which Figure 1 is a side elevation of the improved tube cut-off machine showing the parts in the starting position, parts being broken away for the purpose of illustration;

Fig. 2, a transverse sectional view taken as on the line 2—2, Figure 1;

Fig. 3, a transverse sectional view taken as on the line 3—3, Figure 1;

Fig. 4, a perspective view of the cut-off tool;

Figs. 5 and 6, perspective views of the two facing tools; and

Fig. 7, an enlarged plan sectional view of the machine, and Fig. 8, a detail sectional view taken on the line 8—8, Fig. 2.

Similar numerals refer to similar parts throughout the several views.

The machine may be mounted upon a bed 10 supported above the floor by any suitable means such as legs or uprights 11.

Spaced housings 12 and 13 are supported upon the bed 10 and an upright motor supporting bracket 14 is mounted upon the bed near one end thereof and supports the motor 15.

A second motor 16 is mounted upon the bed preferably, beyond the bracket 14 and the shaft 17 thereof may be operatively connected through a gear reduction indicated generally at 18 with the cam shaft 19 which is journaled in suitable bearings 20 mounted upon the bed 10.

A bearing indicated generally at 21 is provided with wings 22 having the longitudinal ribs 23 slidably mounted within the ways 24 formed at the upper ends of the housings 12 and 13 whereby the bearing 21 may be slidably moved in said ways longitudinally of the machine as will be later described.

The rotating tool holder is indicated generally at 25 and has the peripheral ribs 26 rotatably mounted within the annular groove 27 formed in the interior of the bearing 21.

This tool holder has a pulley 28 formed integrally therewith at one side of the bearing 21 and provided with a V groove 29 to receive the V belt 30 which is located around the pulley 31 upon the shaft 32 of the upper motor 15.

Bearings 33 and 34 are mounted upon the housing 12 and 13, respectively, for supporting clamping collets as will now be described.

A tubular housing 35 is mounted within the bearing 33 and provided with a reduced portion 36 which extends longitudinally toward the tool holder 25.

The split collet 37 is provided with a screw threaded inner end 38 threaded within the tubular housing 35, the split end of the collet extending beyond the end of the tubular housing and being tapered at its end as shown at 39.

The collet clamping collar 40 is slidably mounted upon the exterior of the projecting portion 36 of the tubular housing and extends beyond the same having the internally tapered end 41 engaging the tapered end 39 of the collet.

A peripheral groove 42 is formed in the enlarged outer end portion 43 of the clamping collar to receive the studs 44 carried by the yoke 45 which yoke is pivoted at 46 upon the housing 12 and provided with the depending lever arm 47 pivotally connected as at 48 to the piston rod 49 of a fluid cylinder 50.

The bearing 34 has a tubular projection 51 of reduced external diameter extending toward the tool holder 25.

The split clamping collet 52 is mounted within the said bearing by means of the threaded outer end 53 engaged in the internal threads 54 of the bearing and tapered end 55 of the collet projects beyond the end of the reduced projection 51.

The clamping collar 56 is mounted for longitudinal sliding movement upon the tubular projection 51 and is provided with the internally tapered projection 57 engaging the tapered end 55 of the collet.

The collar 56 is provided with a peripheral groove 58 which receives the studs 59 upon the yoke 60. This yoke is pivoted at 61 upon the housing 13 and has the depending lever arm 62 formed thereon and pivotally connected as at 63 with a pair of ears 64 upon the outer end of the fluid cylinder 50.

The cut-off tool 65 and the left and right facing tools 66 and 67, respectively, are mounted in slidable tool carriers 68 mounted for sliding movement within the radial guide grooves 69 in the tool holder 25.

These tool carriers are adapted to be universally operated by means of a collar 70 slidably mounted upon the exterior of the tubular housing 40 and mounted to rotate in unison with the tool holder 25 as by means of posts 71 fixed to the tool holder 25 as by the pins 72 and slidably located within the longitudinal bores 73 in said collar.

An inclined post 74 is fixed to each tool carrier 68 as by a pin 75 and slidably received within the corresponding inclined bore 76 in the collar 70.

A peripheral flange 77 is formed around the inner end of the collar 70 and a flange ring 78 is fixed by any usual and well-known means to the other end of the collar, forming a peripheral groove within which is located a ring 79 bearing against the ball-bearing 80 located between said ring and the flange 77.

Studs 81, carried by a yoke 81', are located within suitable openings 82 in the ring 79.

The yoke 81' is pivoted as at 83 upon the housing 12 and provided with the depending lever arm 84 having a conical roller 85 located within the cam groove 86 in the cam 87 fixed upon the cam shaft 19.

A conical roller 88 is carried by the tool holder bearing 21 and rides within a cam groove 89 formed in the cam 87.

A pair of longitudinally disposed guide rods 90 may be connected at one end to the housing 13, the other ends of these rods being connected to a cross frame 91 which may be supported above the floor as by legs 92.

A cross head 93 is mounted for longitudinal adjustment upon the guide rods 90 being preferably provided with the split bearings 94 having bolts 95 for clamping the bearings around the guide rods to hold the cross head in adjusted position thereon.

The upright post 96 is formed upon the cross head 93 and carries a micro-switch indicated generally at 97 and provided with a plunger 98.

This micro-switch controls the starting of the motor 16, being connected to said motor in any usual and well-known manner so that depression of the plunger 98 will close the circuit to the motor.

A rocker shaft 99 is journaled in the housing 13 and in the cross frame 91 and provided with a key 100.

A rocker arm 101 is fixed upon this rocker shaft and has a roller 102 journaled in its free end and arranged to ride upon the cam 103 fixed upon the cam shaft 19.

A cam 104 is fixed upon the cam shaft adjacent to the cam 103 and adapted to actuate the plunger 105 of the micro-switch 106 which is mounted upon the bed 10 and adapted to control the stopping of the motor 16 by opening the circuit to said motor when the plunger 105 is depressed.

A rocker arm 107 is provided with a bearing portion 108 slidably mounted upon the rocker shaft 99 and keyed thereto by the key 100.

A cylinder 109 is carried by the upper end of the arm 107 and has mounted therein a plunger 110 having a longitudinally disposed stop screw 111 adjustably mounted therein and provided with the head 112 for engagement by the end of the tube 113 which is to be cut.

A cap 114 is mounted upon the screw 111 and a coil spring 115 is interposed between said cap and the end of the cylinder.

The rear end of the plunger 110 may be provided with a head 116 for contact with the plunger 98 of the micro-switch 97.

A bumper plate 117 is carried by the arm 107 and a coil spring 118 may be connected to said bumper plate and to the cross head 93 to urge the parts into the position best shown in Fig. 2.

In the operation of the machine with the motor 15 operating and continuously rotating the tool holder 25, the tube 113 to be cut off is inserted from the left side of the machine, as viewed in Figs. 1 and 7 being passed through the clamping collets and the open center of the tool holder and into contact with the head 112 of the plunger 110 moving said plunger to the right so that the head 116 thereof contacts the plunger 98 of the micro-switch 97 closing the circuit to the motor 16.

This starts the rotation of the cam shaft 19 and also operation of the fluid cylinder 50 moving the plunger thereof toward the right and the cylinder toward the left and through the lever arms 47 and 62 and yokes 45 and 60, respectively, the collet clamping collars 43 and 56 are moved in opposite directions away from each other, the tapered ends thereof engaging the tapered ends of the collets and clamping them tightly upon the tube 113.

With the tube thus held firmly against rotation and longitudinal movement, the cam groove 86 acting upon the roller 85 will swing the lever arm 84 to the left, as viewed in Fig. 1, swinging the yoke 81 to the right and through the ring 79 the collar 77 will be moved to the right.

The inclined posts 74 upon the tool carriers 68 will ride through the inclined bores 76 in the collar 77 moving the tool carriers radially inward, the cutting off tool 65 severing the tube.

At this point the cam groove 89 acting upon the roller 88 will cause the tool holder bearing 21 to move to the left facing the left hand end of the cut by the facing tool 66 after which the bearing 21 moves to the right facing the right hand side of the cut by the tool 67 after which the bearing 21 is moved back to the normal position.

Each end of the cut is thus faced to accurate measurements.

At this time the high point of the cam 103 acting upon the roller 102 will swing the arm 101 and through it the shaft 99 and arm 107 to the dotted line position shown in Fig. 2, and the high point of the cam 104 will engage the plunger 105 of the micro-switch 106 stopping the motor 16 and operating the fluid cylinder 50 and plunger 49 in the opposite direction to release the clamping collets.

When the arm 107 is swung to the dotted line position, shown in Fig. 2, the bumper plate 117 will be permitted to swing slightly upon its pivot 119, on the arm 107, so that the notch 120 in the rear side of the bumper plate may receive the stud 121, holding the parts in this position temporarily.

As the tube is again pushed forwardly through the machine the cut off portion thereof will be forced out of the machine, and the end thereof striking the bumper plate 117 and swinging it upon its pivot 119, releasing the notch 120 from the stud 121 and permitting the spring 118 to pull the parts back to the full line position of Fig. 2 and the cut off section of the tube will drop from the machine while the remainder of the tube may be positioned for the next operation of the machine, and the operation will be repeated as above described.

We claim:

1. A machine of the character described including a rotating tool holder, three radially movable tool carriers slidably mounted in said tool holder, a cutting-off tool carried in one tool carrier, a pair of oppositely disposed facing tools carried in the other two tool carriers, means for supporting a tube, or the like to be cut off, axially of said tool holder, and means for producing relative longitudinal movement alternately in opposite directions between the tube and the tool holder.

2. A machine of the character described including a rotating tool holder, three radially movable tool carriers slidably mounted in said tool holder, a cutting-off tool carried in one tool carrier, a pair of oppositely disposed facing tools carried in the other two tool carriers, means for supporting a tube, or the like to be cut off, axially of said tool holder, and means for moving the tool holder longitudinally alternately in opposite directions relative to the tube.

3. A machine of the character described including a rotating tool holder, three radially movable tool carriers slidably mounted in said tool holder, a cutting-off tool carried in one tool carrier, a pair of oppositely disposed facing tools carried in the other two tool carriers, means for supporting a tube, or the like to be cut off, axially of said tool holder, means for moving the tool holder longitudinally alternately in opposite directions relative to the tube, and for then returning the tool holder to the initial position.

4. A machine of the character described including a rotating tool holder, a plurality of radially movable tool carriers slidably mounted in said tool holder, cutting and facing tools carried in said tool carriers, means for supporting a tube, or the like to be cut off, axially of said tool holder, and means operated by the insertion of a tube into the machine for producing relative longitudinal movement alternately in opposite directions between the tube and the tool holder.

5. A machine of the character described including a rotating tool holder, three radially movable tool carriers slidably mounted in said tool holder, a cutting-off tool carried in one tool carrier, a pair of oppositely disposed facing tools carried in the other two tool carriers, means for supporting a tube, or the like to be cut off, axially of said tool holder, and means operated by the insertion of a tube into the machine for producing relative longitudinal movement alternately in opposite directions between the tube and the tool holder.

6. A machine of the character described including a rotating tool holder, three radially movable tool carriers slidably mounted in said tool holder, a cutting-off tool carried in one tool carrier, a pair of oppositely disposed facing tools carried in the other two tool carriers, means for supporting a tube, or the like to be cut off, axially of said tool holder, means operated by the insertion of a tube into the machine for clamping the tube, and means for producing relative longitudinal movement alternately in opposite directions between the tube and the tool holder.

7. A machine of the character described including a rotating tool holder, a plurality of radially movable tool carriers slidably mounted in said tool holder, cutting and facing tools carried in said tool carriers, means operated by insertion of a tube axially through the machine for moving the tool carriers radially in the rotating tool holder, and means operated by the insertion of the tube for moving the tool holder longitudinally, alternately in opposite directions relative to the tube.

8. A machine of the character described including a rotating tool holder, a plurality of radially movable tool carriers slidably mounted in said tool holder, cutting and facing tools carried in said tool carriers, fluid cylinder means operated by insertion of a tube axially through the machine for moving the tool carriers radially in the rotating tool holder, and means operated by the insertion of the tube for moving the tool holder longitudinally, alternately in opposite directions relative to the tube.

9. A machine of the character described including a rotating tool holder, a plurality of radially movable tool carriers slidably mounted in said tool holder, cutting and facing tools carried in said tool carriers, means operated by insertion of a tube axially through the machine for moving the tool carriers radially in the rotating tool holder, and cam means operated by the insertion of the tube for moving the tool holder longitudinally, alternately in opposite directions relative to the tube.

THERLOW C. GEST.
RALPH E. SPIKER.